Sept. 27, 1966     M. M. RASPANTE     3,275,023
TEMPORARY SEALING MEANS FOR CONDUIT UNDER PRESSURE
Filed Feb. 17, 1964     2 Sheets-Sheet 1
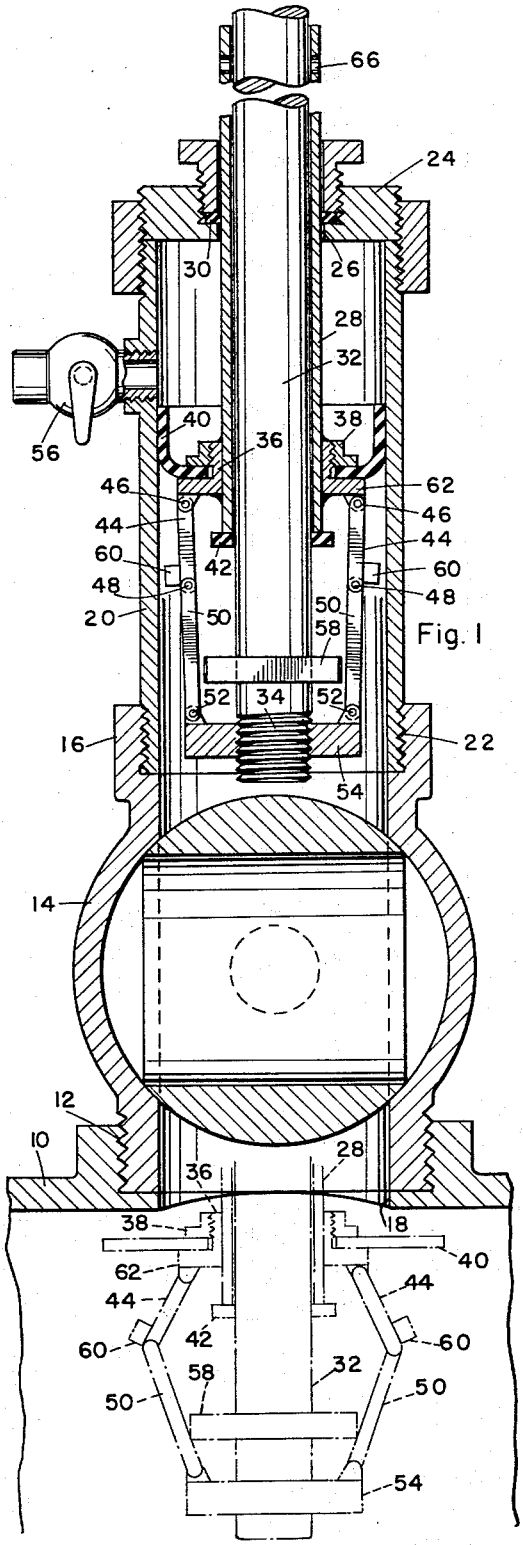
INVENTOR.
MORRIS M. RASPANTE
BY *Knox & Knox*

Sept. 27, 1966  M. M. RASPANTE  3,275,023
TEMPORARY SEALING MEANS FOR CONDUIT UNDER PRESSURE
Filed Feb. 17, 1964  2 Sheets-Sheet 2

INVENTOR.
MORRIS M. RASPANTE
BY Knox & Knox

3,275,023
TEMPORARY SEALING MEANS FOR CONDUIT UNDER PRESSURE
Morris M. Raspante, 5908 Michael St., San Diego, Calif.
Filed Feb. 17, 1964, Ser. No. 345,414
4 Claims. (Cl. 137—315)

The present invention relates generally to a tool which is used for temporarily sealing a valved connection to a conduit under pressure and more particularly to such a tool which is provided with a flexible washer for engaging the inner surface of a chamber adjacent the valved connection.

Very large diameter fluid conduits, such as high pressure water distribution lines, are usually provided at spaced intervals with valved distribution lines. The valves in these lines frequently need servicing or replacement. Storage tanks for fluid under pressure are also provided with valved feeder lines from which fluid may be bled intermittently. The valves in these lines are also subject to wear and must be serviced or replaced at frequent intervals and it is sometimes necessary to replace sections of the feeder lines.

To provide the necessary servicing of these valves and feeder lines it has hitherto been necessary to shut off the main supply in the fluid line or to drain the tank. In many cases interruption of essential services results.

The primary object of this invention is to provide an improved apparatus for insertion into the fluid conduit or tank whereby service connection repairs and replacements may be made without the necessity of shutting down the main or draining the tank.

It is a further object of this invention to provide an improved apparatus of the class described which utilizes a thin, flexible annular seal for engaging the inner wall of the conduit or tank.

It is a still further object of this invention to provide an improved sealing means which is readily adaptable to various sizes of service connections.

Finally it is an object to provide a temporary sealing means of the aforementioned character which is simple to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and in which:

FIGURE 1 is a view in section of the apparatus in position on the valve and, in broken lines, the initial position of the annular seal and associated parts after insertion into the conduit;

FIGURE 2 is a view similar to FIGURE 1 with the apparatus in conduit sealing position;

Figure 3:
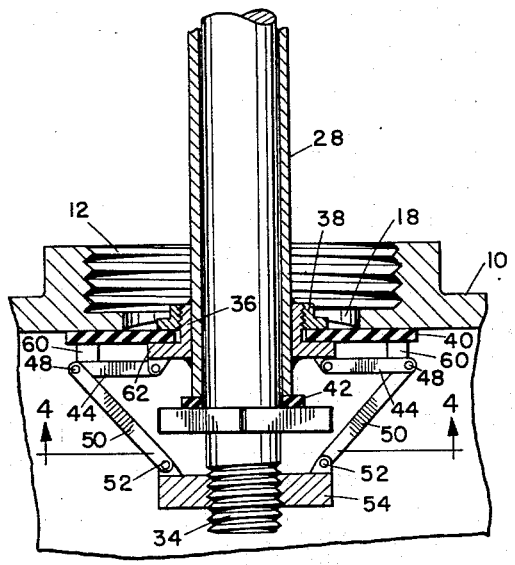
FIGURE 3 is a view similar to FIGURE 2 but with the valve removed.

Referring to the drawings, the reference numeral 10 indicates a section of a member that is subjected to fluid under pressure. This may be a high pressure large diameter main, storage tank or reservoir. Connected to member 10 by any suitable means such as screw threads 12, is a conventional plug or gate valve 14 having a flanged nipple 16 which is adapted to receive the usual distributing pipe system, not shown.

My improved apparatus for temporarily sealing the opening 18 in member 10, to permit removal and/or servicing of valve 14, is mounted in a sleeve member 20. On one end of member 20 is suitable connecting means, here shown as threads 22 by which it may be connected in fluid tight relation to nipple 16. The other end of sleeve member 20 is provided with a removable closure member 24 held in place by a conventional coupling nut.

Closure member 24 is formed with a central cylindrical opening 26 in which is slidably mounted hollow elongated support 28. A suitable packing gland 30 provides a seal between closure member 24 and support 28.

Slidably and rotatably mounted with a relatively slight clearance within the support 28 is an actuating rod 32, one end of which is threaded as at 34 for the reception of a threaded nut 54, the purpose of which will be hereinafter explained. A flanged collar 36 is secured as by welding to a point adjacent one end of support 28. This collar 36 has secured thereto, by any conventional means such as nut 38, a thin disc of flexible and resilient material constituting on annular seal 40. A washer 42 is secured to the end of support 28 in wiping sealing engagement with rod 32.

A series of links 44 are pivotally mounted at 46 to collar 36. Any number of links may be used, four, equally spaced around the collar having been found to be satisfactory. Pivotally attached to the ends of links 44 at 48 are a second series of links 50, the other ends of which are pivotally mounted as at 52 to a nut 54 which is threaded on the end of rod 32.

Operation

Figure 4:
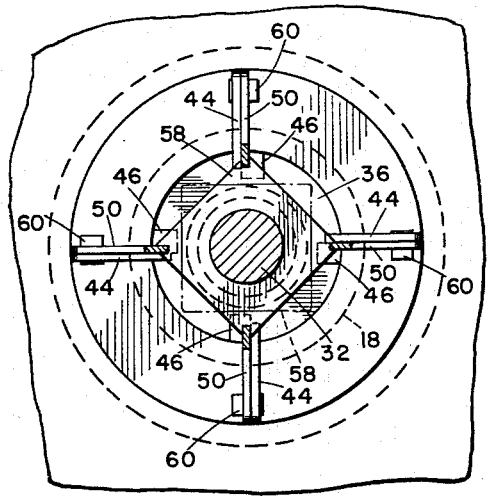
FIGURE 4 is a section on line 4—4 of FIGURE 3.

To apply my improved temporary sealing means to member 10 the existing piping is first detached from the valve nipple 16 with the valve 14 in closed position as shown in FIGURE 1. The sleeve member 20 with the annular seal 40 and attached members positioned as shown is secured to the nipple 16. Gate valve 14 is then opened slightly to permit sleeve 20 to fill with liquid at the same time forcing annular seal 40 upwardly. Petcock 56 is opened to bleed air from the upper part of sleeve member 20. As soon as liquid appears at the petcock 56, it is closed and main valve 14 is fully opened. The annular seal 40 is then forced through valve 14 by exerting pressure on the upper end of the rod 32 until it is completely within member 10 as shown by broken lines in FIGURE 1. Rod 32 is then rotated through approximately ¼ of one revolution. In FIGURE 4 a non-circular cam 58 fixed to rod 32 adjacent to nut 54 is shown in broken lines in the position it would assume as shown in FIGURE 1 with the links 44 and 50 in contracted position. The solid line position of the cam 58 in FIGURE 4 is the position it takes after the rod 32 has been rotated and the links are forced to initiate their divergent movement toward the position shown in broken lines in FIGURE 1. This causes the non-circular cam 58, which is fixed to rod 32, to engage links 50 and pivot them about pivots 52. The links 44 and 50 will then assume the position shown in the broken lines in FIGURE 1. Rod 32 is then pulled up in support 28 until cam 58 is in sealing contact with washer 42. At this point the anular seal 40 will be in contact with the inner surface of member 10. It is held in this position by clamp blocks 60 fixed to the outer ends of links 44. These clamp blocks are of substantially the same thickness as the flange 62 on collar 36.

Clamps 60 would normally position the annular seal 40 in a flat plane while the inner surface of the member 10 is curved. The diameter of the member 10 is relatively large when compared with the opening 18 however, so that the deviation of the section covered by annular seal 40 from a flat surface is very slight.

It has been found that the normal clearance in the parts permits perfect sealing of the annular seal 40 with the inner surface of member 10. The support 28 and rod 32 are held in position by pin 64 which engages registering opening 66 and 68 in support 28 and rod 32, respectively.

With the seal in position shown in FIGURE 2 pressure of the fluid in member 10 will hold it in contact with the inner surface. Sleeve 20 and closure member 24 may then be removed by detaching sleeve 20 from valve 14 and sliding them axially along support 28. Valve 14 may then be removed for replacement or repair as the case may be.

Figure 5:
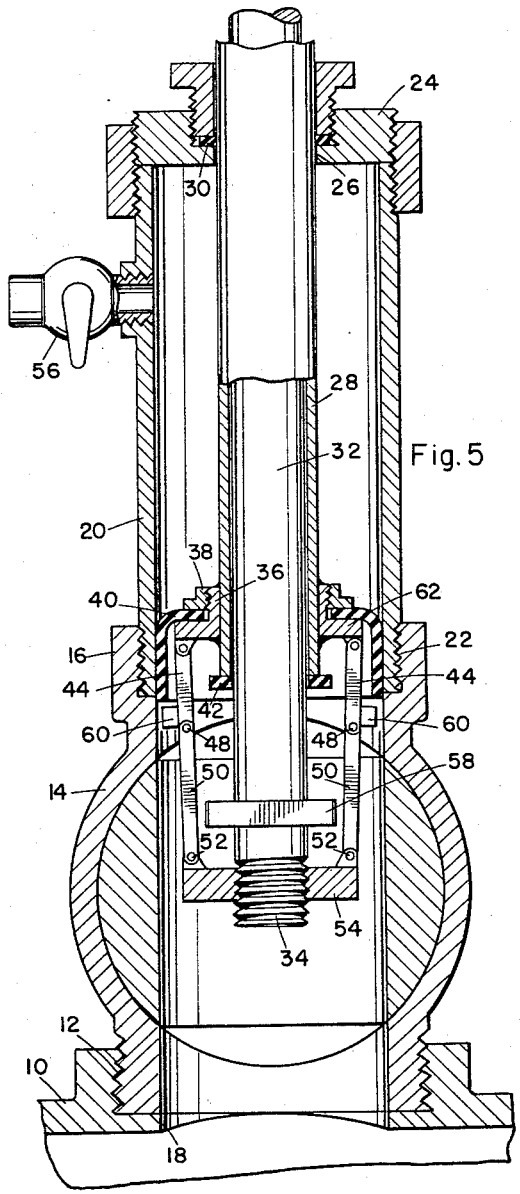
FIGURE 5 is a view illustrating the removal of the apparatus.

To mount new or overhauled valve it is secured to the sleeve member 20, slipped over the support 28 and secured to member 10. Closure member 24 is then positioned on sleeve 20 and the temporary seal apparatus may now be removed. This may be readily accomplished by filling sleeve 20 with liquid through petcock 56 and then closing it, removing pin 64 and forcing seal 40 and associated structure into the member 10. This will cause the links 44 and 50 to assume a position where they are substantially in alignment as shown in FIGURE 5. Petcock 56 may now be opened very slowly and the fluid pressure in member 10 applied to the under side of annular seal 40 will force it through valve 14 and into sleeve 20 as shown in FIGURE 5. Fluid bleeding from petcock 56 will control the speed of the washer as it moves into the sleeve 20. When the bottom of rod 32 has cleared the top of valve 14, this valve may be closed, the sleeve 20 and temporary sealing apparatus removed and the valve 14 again connected to the distributing pipe system.

It is understood that minor variation from the form of the invention disclosed herein may be made without departure from the spirit and scope of the invention, and that the specification and drawings are to be considered as merely illustrative rather than limiting.

I claim:

1. Apparatus for temporarily sealing an opening in a chamber containing fluid under pressure facilitate removal of a valve closing said opening, said apparatus comprising:

a sleeve member;

means on one end of said sleeve member for connection to the valve on the side thereof remote from said chamber;

closure means on the other end of said sleeve member;

an elongated hollow support member extending through said closure means in sealing relation therewith;

a rod slidably mounted in said support member;

a thin disc of flexible material constituting an annular seal secured adjacent one end of said support member;

and clamping means connected between adjacent ends of said rod and said support member for engaging and holding the periphery of said thin, flexible annular seal in engagement with the inner wall of said chamber adjacent and surrounding said valved opening.

2. Apparatus for temporarily sealing an opening in a chamber containing fluid under pressure to facilitate removal of a valve closing said opening, said apparatus comprising:

a sleeve member;

means on one end of said sleeve member for connection to the valve on the side thereof remote from said chamber;

closure means on the other end of said sleeve member;

an elongated hollow support member extending through said closure means in sealing relation therewith;

a rod slidably mounted in said support member;

a thin, flexible annular seal, the inner periphery of which is secured to said support member adjacent to one end thereof;

a first series of links pivotally connected to said support member between said annular seal and said one end of said support member;

a second series of links connected between said first links and said rod; and means on said first series of links for engaging said annular seal and operative upon movement of said rod toward said support member whereby said disc is held in sealing contact with the inner wall of said chamber adjacent and surrounding said opening.

3. Apparatus for temporarily sealing an opening in a chamber containing fluid under pressure to facilitate removal of a valve closing said opening, said apparatus comprising:

a sleeve member;

means on one end of said sleeve member for connection to the valve on the side thereof remote from said chamber;

closure means on the other end of said sleeve member;

an elongated hollow support member extending through said closure means in sealing relation therewith;

a rod slidably and rotatably mounted in said support member;

a thin, flexible annular seal, the inner periphery of which is secured adjacent one end of said support member;

a first series of links pivotally connected to said support member between said annular seal and said one end of said support member;

a second series of links connected between said first links and said rod;

a cam member on said rod for engaging said second series of links and displacing them outwardly, thereby displacing outwardly said first series of links with respect to said second series of links;

and means on said first series of links for engaging said annular seal whereby said annular seal may be moved into a chamber and held in sealing contact with an inner wall of said chamber adjacent and surrounding an opening in said chamber.

4. Apparatus for temporarily sealing an opening in a chamber containing fluid under pressure to facilitate removal of a valve closing said opening, said apparatus comprising:

a sleeve member;

means on one end of said sleeve for connection to the valve on the side thereof remote from said chamber;

closure means on the other end of said sleeve member;

an elongated hollow support member extending through said closure means in sealing relation therewith;

a rod slidably and rotatably mounted in said support member;

a flexible annular seal secured adjacent one end of said support member;

said rod having a threaded end extending through said support member at said one end thereof;

a nut rotatably mounted on said threaded end;

a first series of links pivotally connected to said support member between said annular seal and said one end of said support member;

a second series of links connected between said first links and said nut;

a cam member on said rod for engaging said second series of links and displacing them outwardly, thereby displacing outwardly said first series of links with respect to said second series of links;

and means on said first series of links for engaging said annular seal whereby said annular seal may be moved into a chamber and held in sealing contact with an inner wall of said chamber adjacent and surrounding an opening in said chamber.

References Cited by the Examiner

UNITED STATES PATENTS 2,176,260  10/1939  Johnson _____ 138—92 X

WILLIAM F. O'DEA, *Primary Examiner.*

ISADOR WEIL, *Examiner.*

D. MATTHEWS, *Assistant Examiner.*